(12) United States Patent
Hattori

(10) Patent No.: US 6,532,504 B2
(45) Date of Patent: Mar. 11, 2003

(54) SYSTEM FOR DATA TRANSMISSION TO RECORDING DEVICE

(75) Inventor: Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 314 days.

(21) Appl. No.: 09/730,202

(22) Filed: Dec. 5, 2000

(65) Prior Publication Data

US 2001/0005877 A1 Jun. 28, 2001

(30) Foreign Application Priority Data

Dec. 27, 1999 (JP) .......................................... 11-370282

(51) Int. Cl.$^7$ .............................. G06F 3/06; G06F 5/06

(52) U.S. Cl. ....................................................... 710/52
(58) Field of Search ..................................... 710/52, 59

(56) References Cited

U.S. PATENT DOCUMENTS 6,487,616 B1 * 11/2002 Hayashi ....................... 710/59

* cited by examiner

*Primary Examiner*—David L. Robertson
(74) *Attorney, Agent, or Firm*—Hogan & Hartson, LLP

(57) ABSTRACT

Whether or not a recording device has a buffer underrun prevention function is determined. When such a function is present, recording data is sent to the recording device without being stored in a host buffer memory provided at the host device.

10 Claims, 2 Drawing Sheets

SYSTEM FOR DATA TRANSMISSION TO RECORDING DEVICE

BACKGROUND OF THE INVENTION

1. Field of the Invention

The present invention relates to a recording control method for controlling the recording of data supplied from a host device, such as a computer, onto a recording medium using a recording device, such as an optical disk recording and reproduction device.

2. Description of the Related Art

Disk players in which signals are read from a disk using an optical pick-up are widely used. More recently, optical disk recording and reproduction devices equipped with, in addition to a reproduction function, a recording function for recording a signal to a disk using a laser from an optical pick-up have been introduced into the marketplace. Some of these optical disk recording and reproduction devices are adapted to signal disk recording at a speed twice, four, six, eight, and even twelve times a standard speed.

A typical optical disk recording and reproduction device adapted to high speed recording comprises a memory, or a buffer, for temporarily storing recording data, or a recording signal from a host device, and has a structure in which the recording data is read from the memory to be recorded onto a disk.

An optical disk recording and reproduction device having a buffer memory has a structure in which recording data stored in the buffer memory is read to be recorded onto a disk. However, at a high disk recording speed, the storage of new recording data supplied from a host device in the buffer memory may not keep pace with the reading of data from the buffer memory. This is commonly referred to as buffer underrun. Buffer underrun may cause problems such as interruption of a disk recording operation due to a lack of recording data or other errors.

In order to address this problem, it has been proposed that a buffer memory be given a larger capacity. However, memory capacity is subject to limitation, and, even when possible, enlargement of memory capacity increases the cost of the memory, and of the device. Also recently, optical disk recording and reproduction devices have been developed which can record recording data so as to succeed to the recorded data even though disk recording should be discontinued due to lack of recording data.

Another new technology has been developed to prevent buffer underrun by temporarily storing recording data, or a recording signal, in a temporary storage region provided on a computer hard disk or other host device, and then reading therefrom the stored recording data to be sent to an optical disk recording and reproduction device. Such a technology, however, has a problem that a temporary region, referred to as a host buffer memory, may not have sufficient capacity as it is provided on a hard disk where the computer operating program software and other data are other data are stored. Even more disadvantageous is that this configuration may require a longer recording operation time because recording data is first stored in a host buffer memory before being read therefrom to be supplied to an optical disk recording and reproduction device.

SUMMARY OF THE INVENTION

The present invention is directed to providing a recording control method capable of addressing the above described problems.

According to the present invention, recording data, or a recording signal for transmission to a recording device, supplied from a host device having a host buffer memory for temporary storage of recording data is recorded into a recording medium using the recording device. In particular, determination is made as to whether or not the recording device has a buffer underrun prevention function. When it is determined that the device has such a function, recording data is supplied directly to the recording device without being stored in the host buffer memory.

DESCRIPTION OF THE PREFERRED EMBODIMENTS

Figure 1:
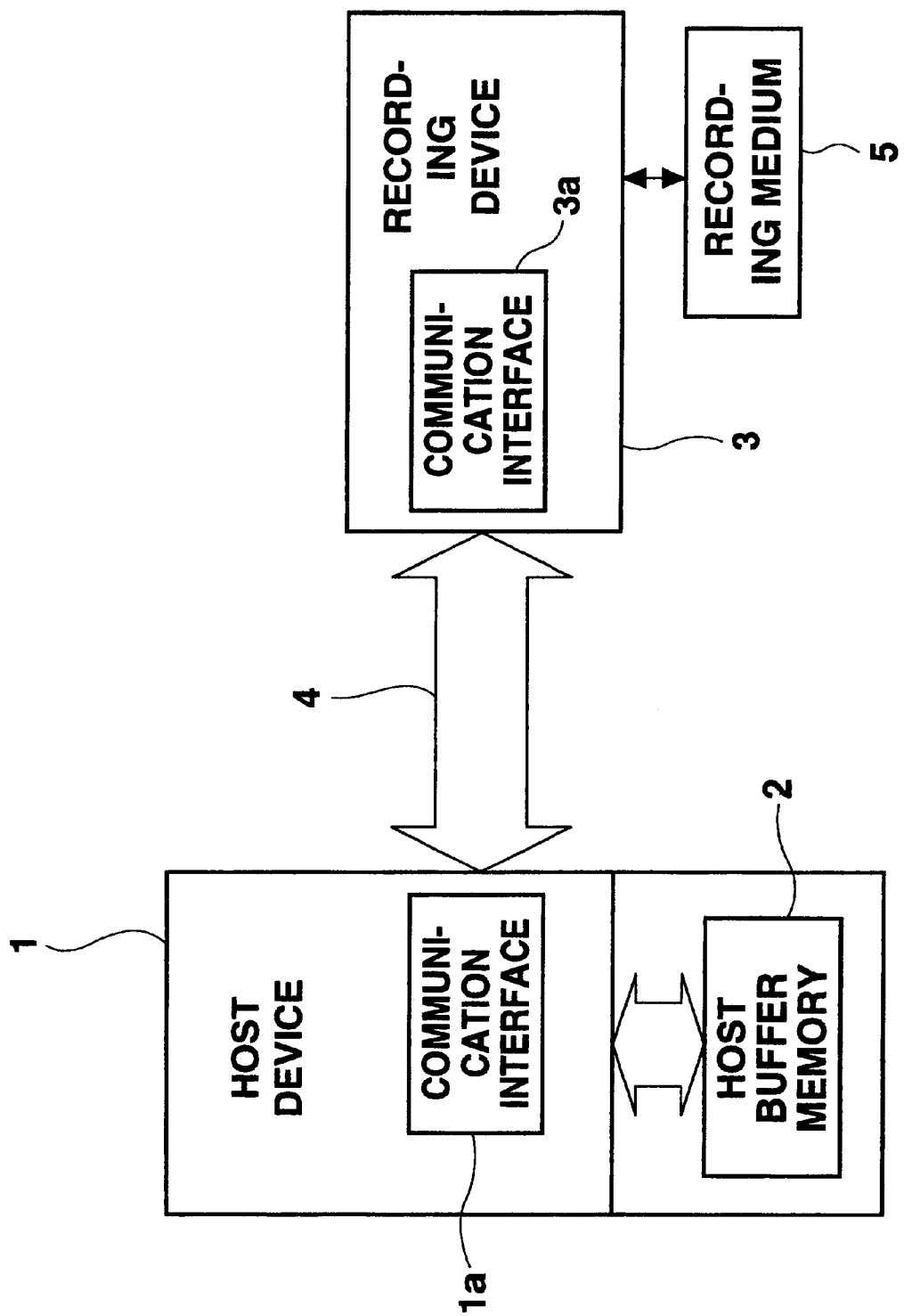
FIG. 1 is a circuit diagram showing an example device according to the present invention.
Figure 2:
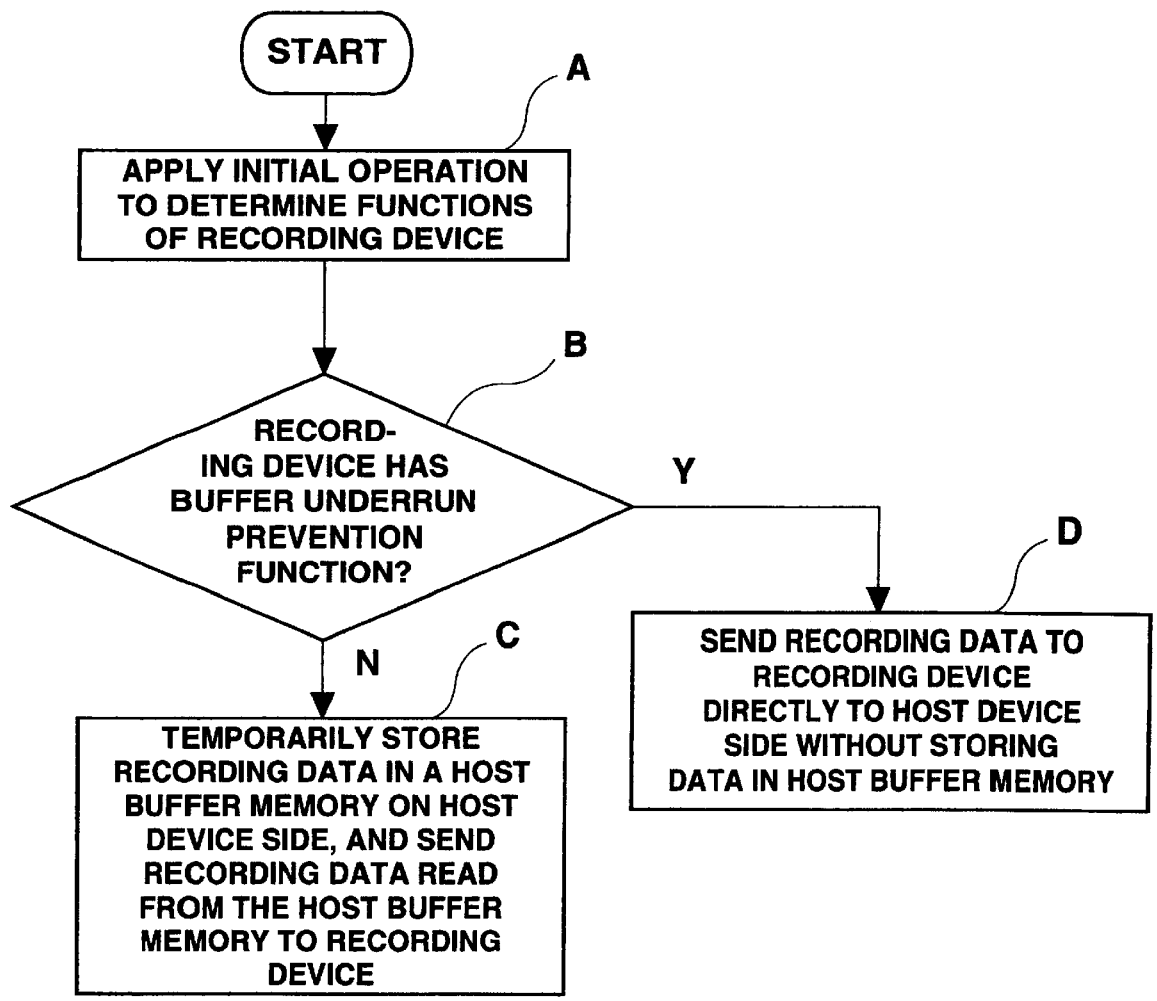
FIG. 2 is a flowchart of a recording control method according to the present invention.

FIG. 1 is a block circuit diagram showing an example device according to the present invention. FIG. 2 is a flowchart of a recording control method according to the present invention. As shown in FIG. 1, a host device 1 controls recording operation and so on for recording data onto a disk, and incorporates a host buffer memory 2 on a hard disk for use as a temporary region for temporary storage of recording data. The host device 1 also incorporates a communication interface 1a.

A recording device 3 may be an optical disk recording and reproduction device, of which two different types are available: one with a buffer memory and a buffer underrun prevention function utilizing the buffer memory, and the other without the prevention function. The recording device 3 incorporates a communication interface 3a, and is connected to the host device 1 via a cable 4. The recording device 3 writes recording data onto a recording medium 5, such as a CD-R.

In the above structure, the recording device 3 with a buffer underrun prevention function has an additional function for sending to the host device 1 side a message indicating existence of a buffer underrun prevention function. The host device 1 and the recording device 3 communicate to each other via the respective communication interfaces 1a, 3a and the cable 4.

A device according to the present invention is constructed as described above. A recording control method of the present invention will next be described with reference to the flowchart of FIG. 2.

The host device 1, when activated, initiates a control operation based on a program stored in a memory therein, beginning with function check, included in initial operation, over the functions of the recording device 3, connected thereto (Step A).

In a function check operation at Step A, the host device 1 issues a check command to the recording device 3. In response to the command, the recording device 3 returns to the host device 1 a message indicating the state of a function. Specifically, the recording device 3 sends to the host device 1 a message indicating whether or not the recording device 3 includes a buffer underrun prevention function. Upon receipt of such a reply message, the host device 1 determines whether or not the recording device 3 has a buffer underrun prevention function (Step B). When no message indicative of possession of a buffer underrun prevention function is returned from the recording device 3, the host device 1 may preferably determine that such a function is not available within the recording device 3.

Upon determining that no buffer underrun prevention function is available with the recording device 3, the host device 1 applies a control operation such that recording data, or recording signals, are temporarily stored in the host buffer memory 2 in the host device 1, and are then read therefrom to be supplied to the recording device 3 (Step C). That is, in such a case, recording data is first stored in the host buffer memory 2 before being supplied to the recording device 3. The recording data is then stored in a buffer memory in the recording device 3, and read therefrom to be recorded onto a recording medium such as an optical disk.

As described above, with respect to a recording device 3 without a buffer underrun prevention function, data recording control operation utilizing the host buffer memory 2 and the buffer memory in the recording device 3 is applied so that occurrence of buffer underrun is prevented. Specifically, a recording speed may be kept under a predetermined speed.

On the other hand, when it is determined at Step B that the recording device 3 includes a buffer underrun prevention function, the host device 1 controls that the output of recording data, or recording signals, such that they are sent to the recording device 3 without being stored in the host buffer memory 2 (Step D). That is, in such a case, although the recording data is supplied to the recording device 3 without being temporarily stored in the host buffer memory 2, the buffer underrun prevention function, provided in the recording device 3, ensures reliable recording of the recording data without buffer underruns.

As described above, with respect to a recording device 3 with a buffer underrun prevention function, a host buffer memory 2 is not used during recording by the recording device 3. This helps increase recording speed.

It should be noted that, whereas in the above example the host buffer memory 2 in the host device 1 is not used when the recording device 3 has a buffer underrun prevention function, it is of course possible to configure the present invention so as to include a selection function such that use of a host buffer memory 2 may be selected even when a recording device 3 having a buffer underrun preventing function is used during the recording operation. Also, a hard disk, such as is generally provided to a personal computer, may be used as a host buffer memory 2, which can eliminate the need for providing a dedicated memory to thereby rationalize costs.

In this embodiment, detection is made as to whether or not a recording device has a buffer underrun prevention function, and, when it is determined that the recording device has such a function, recording data is sent to the recording device without being stored in a host buffer memory. This improves the speed and efficiency of the recording operation.

Further, because a host buffer memory is not necessary, it is unnecessary to enlarge memory capacity in consideration of the use condition of the host device.

Still further, when it is determined that the recording device lacks a buffer underrun prevention function, recording data may be temporarily stored in the host buffer memory, and recording data stored in the host buffer memory be read therefrom to be supplied to the recording device. This arrangement makes it possible to apply recording control suitable for various recording devices.

Yet further, when a hard disk is used as a host buffer memory, a dedicated memory is unnecessary. This can prevent additional cost increase.

What is claimed is:

1. A data transmission device for transmitting recording data to a recording device, comprising:

a buffer memory for temporarily storing the recording data intended for transmission to the recording device;

a detection circuit for determining whether or not the recording device has a buffer underrun prevention function; and a transmission control circuit for controlling such that the recording data is transmitted to the recording device without being stored in the buffer memory, when the detection circuits determines that the recording device has a buffer underrun function.

2. A device according to claim 1, wherein the transmission control circuits controls such that the recording data is first stored in the buffer memory, and then read from the buffer memory to be transmitted to the recording device, when the detection circuits determines that the recording device lacks a buffer underrun function.

3. A device according to claim 1, wherein the buffer memory is located on a hard disk.

4. A device according to claim 1, wherein the transmission control circuit sends a command to the recording device and receives by return a signal concerning a function of the recording device to therefrom determine whether or not the recording device has a buffer underrun prevention function.

5. A data transmission method for transmitting recording data which is a recording signal for transmission to a recording device, from a host device having a buffer memory for temporal storage of the recording data, to the recording device, said method comprising the steps of:

determining whether or not the recording device has a buffer underrun prevention function; and controlling such that the recording data is transmitted to the recording device without being stored in the buffer memory when it is determined that the recording device has a buffer underrun prevention function.

6. A method according to claim 5, wherein the transmission control circuit sends a command to the recording device and receives by return a signal concerning a function of the recording device to therefrom determine whether or not the recording device has a buffer underrun prevention function.

7. A data recording system including a host device having a buffer memory for temporary storage of recording data being a recording signal for transmission to a recording device, and a recording device for recording the recording data received from the host device onto a recording medium, wherein the host device comprises:

a buffer memory for temporarily storing the recording data for transmission to the recording device;

a detection circuit for determining whether or not the recording device has a buffer underrun prevention function; and a transmission control for controlling such that the recording data is transmitted to the recording device without being stored in the buffer memory when it is determined that the recording device has a buffer underrun prevention function.

8. A device according to claim 7, wherein
the transmission control circuits controls such that the recording data is first stored in the buffer memory, and then read from the buffer memory to be transmitted to the recording device, when the detection circuits determines that the recording device lacks a buffer underrun function.

9. A device according to claim 7, wherein
the buffer memory is located on a hard disk.

10. A device according to claim 7, wherein
the host device sends a command to the recording device, which in turn outputs a signal concerning a function of the recording device, and the host device determines whether or not the recording device has a buffer underrun prevention function, according to content of the signal returned.

* * * * *